United States Patent
Kumar et al.

(10) Patent No.: US 8,926,911 B2
(45) Date of Patent: Jan. 6, 2015

(54) USE OF MICROSPHERES IN AN EXHAUST GAS TREATMENT DEVICE MOUNTING MAT

(75) Inventors: Amit Kumar, Getzville, NY (US); Thomas S. Lacki, Alden, NY (US)

(73) Assignee: Unifax I LLC, Tonawanda, NY (US)

( * ) Notice: Subject to any disclaimer, the term of this patent is extended or adjusted under 35 U.S.C. 154(b) by 323 days.

(21) Appl. No.: 12/969,776

(22) Filed: Dec. 16, 2010

(65) Prior Publication Data

US 2011/0311403 A1   Dec. 22, 2011

Related U.S. Application Data

(60) Provisional application No. 61/287,350, filed on Dec. 17, 2009.

(51) Int. Cl.
*B01D 50/00* (2006.01)

(52) U.S. Cl.
USPC .......................................... 422/179; 422/177

(58) Field of Classification Search
USPC .................................. 422/179, 180
See application file for complete search history.

(56) References Cited

U.S. PATENT DOCUMENTS

| | | |
|---|---|---|
| 3,012,923 A | 12/1961 | Slayter |
| 3,224,927 A | 12/1965 | Brown et al. |
| 3,458,329 A | 7/1969 | Owens et al. |
| 3,510,394 A | 5/1970 | Cadotte |
| 3,649,406 A | 3/1972 | McNish |
| 3,674,621 A | 7/1972 | Miyamoto et al. |
| 3,771,967 A | 11/1973 | Nowak |
| 3,798,006 A | 3/1974 | Balluff |
| 3,916,057 A | 10/1975 | Hatch et al. |
| 3,957,573 A | 5/1976 | Miyamoto et al. |
| 3,996,145 A | 12/1976 | Hepburn |
| 4,011,651 A | 3/1977 | Bradbury et al. |
| 4,048,363 A | 9/1977 | Langer et al. |
| 4,093,423 A | 6/1978 | Neumann |
| 4,101,280 A | 7/1978 | Frietzsche et al. |
| 4,142,864 A | 3/1979 | Rosynsky et al. |
| 4,156,533 A | 5/1979 | Close et al. |
| 4,204,907 A | 5/1980 | Korklan et al. |

(Continued)

FOREIGN PATENT DOCUMENTS

| | | |
|---|---|---|
| DE | 3925845 | 2/1991 |
| DE | 196 38 542 A1 | 3/1997 |

(Continued)

OTHER PUBLICATIONS

Gulati, Ten Eyck & Lebold. "Durable Packaging Design for Cordierite Ceramic Catalysts for Motorcycle Application" Society of Automotive Engineers Meeting, Detroit, MI, Mar. 1, 1993.

(Continued)

*Primary Examiner* — Tom Duong
(74) *Attorney, Agent, or Firm* — Curatolo Sidoti Co., LPA; Joseph G. Curatolo; Vincent A. Cortese (57) ABSTRACT

A mounting mat for an exhaust gas treatment device including inorganic fibers, organic binder, high temperature resistant inorganic microspheres, and optionally intumescent material. The exhaust gas treatment device includes a housing, a fragile catalyst support structure resiliently mounted within the housing, and the mounting mat disposed in a gap between the housing and the fragile catalyst support structure.

14 Claims, 2 Drawing Sheets

(56) References Cited

U.S. PATENT DOCUMENTS

| | | | |
|---|---|---|---|
| 4,239,733 A | 12/1980 | Foster et al. | |
| 4,269,807 A | 5/1981 | Bailey et al. | |
| 4,269,887 A | 5/1981 | Sonobe et al. | |
| 4,271,228 A | 6/1981 | Foster et al. | |
| 4,279,864 A | 7/1981 | Nara et al. | |
| 4,305,992 A | 12/1981 | Langer et al. | |
| 4,328,187 A | 5/1982 | Musall et al. | |
| 4,332,852 A | 6/1982 | Korklan et al. | |
| 4,335,077 A | 6/1982 | Santiago et al. | |
| 4,353,872 A | 10/1982 | Midorikawa | |
| 4,385,135 A | 5/1983 | Langer et al. | |
| 4,447,345 A | 5/1984 | Kummermehr et al. | |
| 4,617,176 A | 10/1986 | Merry | |
| 4,693,338 A | 9/1987 | Clerc | |
| 4,735,757 A | 4/1988 | Yamamoto et al. | |
| 4,746,570 A | 5/1988 | Suzaki et al. | |
| 4,752,515 A | 6/1988 | Hosoi et al. | |
| 4,797,263 A | 1/1989 | Oza | |
| 4,823,845 A | 4/1989 | Martin et al. | |
| 4,849,382 A | 7/1989 | Shibata et al. | |
| 4,863,700 A | 9/1989 | Ten Eyck | |
| 4,865,818 A | 9/1989 | Merry et al. | |
| 4,927,608 A | 5/1990 | Wörner et al. | |
| 4,929,429 A | 5/1990 | Merry | |
| 4,985,212 A | 1/1991 | Kawakami et al. | |
| 4,999,168 A | 3/1991 | Ten Eyck | |
| 5,002,836 A | 3/1991 | Dinwoodie et al. | |
| 5,008,086 A | 4/1991 | Merry | |
| 5,024,289 A | 6/1991 | Merry | |
| 5,032,441 A | 7/1991 | Ten Eyck et al. | |
| 5,073,432 A | 12/1991 | Horikawa et al. | |
| 5,079,280 A | 1/1992 | Yang et al. | |
| 5,094,073 A | 3/1992 | Wörner et al. | |
| 5,094,074 A | 3/1992 | Nishizawa et al. | |
| 5,119,551 A | 6/1992 | Abbott | |
| 5,139,615 A | 8/1992 | Conner et al. | |
| 5,145,811 A | 9/1992 | Lintz et al. | |
| 5,151,253 A | 9/1992 | Merry et al. | |
| 5,167,765 A | 12/1992 | Nielsen et al. | |
| 5,242,871 A | 9/1993 | Hashimoto et al. | |
| 5,250,269 A * | 10/1993 | Langer | 422/179 |
| 5,254,410 A | 10/1993 | Langer et al. | |
| 5,258,216 A | 11/1993 | Von Bonin et al. | |
| 5,290,522 A | 3/1994 | Rogers et al. | |
| 5,332,609 A | 7/1994 | Corn | |
| 5,332,699 A | 7/1994 | Olds et al. | |
| 5,340,643 A | 8/1994 | Ou et al. | |
| 5,376,341 A | 12/1994 | Gulati | |
| 5,380,580 A | 1/1995 | Rogers et al. | |
| 5,384,188 A | 1/1995 | Lebold et al. | |
| 5,389,716 A | 2/1995 | Graves | |
| 5,419,975 A | 5/1995 | Lintz et al. | |
| 5,453,116 A | 9/1995 | Fischer et al. | |
| 5,482,686 A | 1/1996 | Lebold et al. | |
| 5,488,826 A | 2/1996 | Paas | |
| 5,502,937 A | 4/1996 | Wilson | |
| 5,523,059 A | 6/1996 | Langer | |
| 5,567,536 A | 10/1996 | Lintz et al. | |
| 5,580,532 A | 12/1996 | Robinson et al. | |
| 5,585,312 A | 12/1996 | Ten Eyck et al. | |
| 5,666,726 A | 9/1997 | Robinson et al. | |
| 5,714,421 A | 2/1998 | Olds et al. | |
| 5,736,109 A * | 4/1998 | Howorth et al. | 422/179 |
| 5,811,063 A | 9/1998 | Robinson et al. | |
| 5,811,360 A | 9/1998 | Jubb | |
| 5,821,183 A | 10/1998 | Jubb | |
| 5,853,675 A | 12/1998 | Howorth | |
| 5,862,590 A | 1/1999 | Sakashita et al. | |
| 5,869,010 A | 2/1999 | Langer | |
| 5,874,375 A | 2/1999 | Zoitos et al. | |
| 5,882,608 A | 3/1999 | Sanocki et al. | |
| 5,928,975 A | 7/1999 | Jubb | |
| 5,955,177 A | 9/1999 | Sanocki et al. | |
| 5,955,389 A | 9/1999 | Jubb | |
| 6,000,131 A | 12/1999 | Schmitt | |
| 6,025,288 A | 2/2000 | Zoitos et al. | |
| 6,030,910 A | 2/2000 | Zoitos et al. | |
| 6,051,193 A | 4/2000 | Langer et al. | |
| 6,101,714 A | 8/2000 | Schmitt | |
| 6,158,120 A | 12/2000 | Foster et al. | |
| 6,162,404 A | 12/2000 | Tojo et al. | |
| 6,183,852 B1 | 2/2001 | Rorabaugh et al. | |
| 6,231,818 B1 | 5/2001 | TenEyck | |
| 6,251,224 B1 | 6/2001 | Dong | |
| 6,267,843 B1 | 7/2001 | Helwig et al. | |
| 6,317,976 B1 | 11/2001 | Aranda et al. | |
| 6,468,932 B1 | 10/2002 | Robin et al. | |
| 6,589,488 B1 | 7/2003 | Eyhorn | |
| 6,726,884 B1 | 4/2004 | Dillon et al. | |
| 6,733,628 B2 | 5/2004 | Dinwoodie et al. | |
| 6,737,146 B2 | 5/2004 | Schierz et al. | |
| 6,756,107 B1 | 6/2004 | Schierz et al. | |
| 6,855,298 B2 | 2/2005 | TenEyck | |
| 6,861,381 B1 | 3/2005 | Jubb et al. | |
| 6,923,942 B1 | 8/2005 | Shirk et al. | |
| 6,953,757 B2 | 10/2005 | Zoitos et al. | |
| 7,033,412 B2 | 4/2006 | Kumar et al. | |
| 7,153,796 B2 | 12/2006 | Jubb et al. | |
| 7,160,503 B2 | 1/2007 | Weaver | |
| 7,259,118 B2 | 8/2007 | Jubb et al. | |
| 7,261,864 B2 | 8/2007 | Watanabe | |
| 7,276,280 B2 | 10/2007 | Dinwoodie et al. | |
| 7,387,822 B2 | 6/2008 | Dinwoodie | |
| 7,550,118 B2 | 6/2009 | Merry | |
| 7,820,117 B2 | 10/2010 | Peisert et al. | |
| 7,887,917 B2 | 2/2011 | Zoitos et al. | |
| 7,971,357 B2 | 7/2011 | Ten Eyck et al. | |
| 2001/0036427 A1 | 11/2001 | Yamada et al. | |
| 2001/0046456 A1 * | 11/2001 | Langer et al. | 422/179 |
| 2002/0025750 A1 | 2/2002 | Dinwoodie | |
| 2002/0025904 A1 | 2/2002 | Goto et al. | |
| 2002/0127154 A1 | 9/2002 | Foster et al. | |
| 2003/0049180 A1 | 3/2003 | Fukushima | |
| 2003/0056861 A1 | 3/2003 | Weaver | |
| 2003/0185724 A1 | 10/2003 | Anji et al. | |
| 2004/0052694 A1 | 3/2004 | Nishikawa et al. | |
| 2004/0234436 A1 | 11/2004 | Howorth | |
| 2005/0232828 A1 * | 10/2005 | Merry | 422/179 |
| 2005/0272602 A1 | 12/2005 | Ninomiya | |
| 2006/0153746 A1 | 7/2006 | Merry et al. | |
| 2006/0154040 A1 | 7/2006 | Merry | |
| 2006/0278323 A1 | 12/2006 | Eguchi | |
| 2007/0065349 A1 | 3/2007 | Merry | |
| 2007/0163250 A1 * | 7/2007 | Sane et al. | 60/323 |
| 2007/0207069 A1 | 9/2007 | Kariya et al. | |
| 2007/0218320 A1 | 9/2007 | Weaver | |
| 2008/0253939 A1 | 10/2008 | Hornback | |
| 2009/0060800 A1 | 3/2009 | Fernandez | |
| 2009/0060802 A1 | 3/2009 | Beauharnois | |
| 2009/0114097 A1 | 5/2009 | Saiki | |
| 2009/0162256 A1 | 6/2009 | Ten Eyck et al. | |
| 2009/0188245 A1 | 7/2009 | Merry | |
| 2010/0055004 A1 | 3/2010 | Olson et al. | |
| 2010/0207298 A1 | 8/2010 | Kunze et al. | |
| 2010/0209306 A1 | 8/2010 | Kunze et al. | |
| 2011/0094419 A1 | 4/2011 | Fernando et al. | |
| 2012/0100046 A1 | 4/2012 | Kelsall et al. | |

FOREIGN PATENT DOCUMENTS

| | | |
|---|---|---|
| DE | 199 57 692 A1 | 5/2001 |
| EP | 0 205 704 A1 | 12/1986 |
| EP | 0 279 511 A2 | 8/1988 |
| EP | 0 319 299 A2 | 6/1989 |
| EP | 0 328 293 A1 | 8/1989 |
| EP | 0 396 331 A1 | 11/1990 |
| EP | 0 398 130 A2 | 11/1990 |
| EP | 0 465 203 A1 | 1/1992 |
| EP | 0 508 751 A1 | 10/1992 |
| EP | 0 551 532 A1 | 7/1993 |
| EP | 0 573 834 A1 | 12/1993 |
| EP | 0 643 204 A2 | 3/1995 |
| EP | 0 765 993 A1 | 4/1997 |
| EP | 0 803 643 A1 | 10/1997 |

(56) References Cited

FOREIGN PATENT DOCUMENTS

| | | |
|---|---|---|
| EP | 1 267 048 A1 | 12/2002 |
| EP | 1 314 866 A2 | 5/2003 |
| EP | 1 495 807 A1 | 1/2005 |
| EP | 1 533 409 A1 | 5/2005 |
| EP | 1 696 110 A1 | 8/2006 |
| EP | 1 830 043 A1 | 9/2007 |
| EP | 1 905 895 A1 | 4/2008 |
| EP | 1 931 862 A1 | 6/2008 |
| EP | 1 950 035 A1 | 7/2008 |
| GB | 1 438 762 A | 6/1976 |
| GB | 1 438 784 A | 6/1976 |
| GB | 1 513 808 A | 6/1978 |
| GB | 2 116 476 A | 9/1983 |
| GB | 2 125 458 A | 3/1984 |
| GB | 2 200 129 A | 7/1988 |
| GB | 2 319 247 A | 5/1998 |
| JP | 4-83773 A | 3/1992 |
| JP | 6-272549 | 9/1994 |
| JP | 7-286514 | 10/1995 |
| JP | 2006/177368 A | 7/2006 |
| WO | WO 91/11498 A1 | 8/1991 |
| WO | WO 93/23245 | 11/1993 |
| WO | WO 94/24425 | 10/1994 |
| WO | WO 97/02413 | 1/1997 |
| WO | WO 97/32118 | 9/1997 |
| WO | WO 97/32118 A1 | 9/1997 |
| WO | WO 98/04404 | 2/1998 |
| WO | WO 99/23370 | 5/1999 |
| WO | WO 99/23370 A1 | 5/1999 |
| WO | WO 99/46028 A1 | 9/1999 |
| WO | WO 00/75496 A1 | 4/2000 |
| WO | WO 01/65008 A1 | 9/2001 |
| WO | WO 01/83956 A1 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO 2005/106222 | 11/2005 |
| WO | WO 2006/065534 | 6/2006 |
| WO | WO 2007/143437 | 12/2007 |
| WO | WO 2007/146618 A1 | 12/2007 |
| WO | WO 2008/059249 | 5/2008 |
| WO | WO 2008/103525 A2 | 8/2008 |
| WO | WO 2008/154078 A1 | 8/2008 |
| WO | WO 2008/156942 A1 | 12/2008 |
| WO | WO 2011/067598 | 6/2011 |

OTHER PUBLICATIONS

Maret, Gulati, Lambert & Zink. Systems Durability of a Ceramic Racetrack Converter. International Fuels and Lubricants Meeting, Toronto, Canada, Oct. 7-10, 1991.
English language abstract of DE 19858025; Publication Date: Jun. 21, 2000; Applicant: Aslgawo GmbH.
Tosa Shin'Ichi, et al., "The Development of Converter Canning Technology for Thin Wall Substrate." Honda R&D Tech. Rev., vol. 12, No. 1, pp. 175-182, Japan (2000).
Product Brochure—"There's More to it Than You Think. HDK—Pyrogenic Silica", Wacker Silicones, 6173/10.05/e, Oct. 2005.
Technical Data Sheet—"HDK N20 Pyrogenic Silica", Wacker Silicones, Version 1.0, Jun. 12, 2008.
International Search Report, Form PCT/ISA/210 mailed Mar. 30, 2011 for PCT International Patent Application No. PCT/US2010/060666.
Written Opinion, Form PCT/ISA/237 mailed Mar. 30, 2011 for PCT International Patent Application No. PCT/US2010/060666.
International Preliminary Report on Patentability, Form PCT/IB/373 for PCT International Patent Application No. PCT/US2010/060666, Mailing Date Jun. 28, 2012.

* cited by examiner

USE OF MICROSPHERES IN AN EXHAUST GAS TREATMENT DEVICE MOUNTING MAT

This application claims the benefit of the filing date, under 35 U.S.C. §119(e), of U.S. Provisional Application for Patent Ser. No. 61/287,350, filed on Dec. 17, 2009.

A device for the treatment of exhaust gases, such as a catalytic converter or a diesel particulate trap. The device includes a fragile structure mounted within a housing by a mounting mat that is disposed in a gap between the housing and the fragile structure.

Exhaust gas treatment devices are used on automobiles to reduce atmospheric pollution from engine emissions. Examples of widely used exhaust gas treatment devices include catalytic converters and diesel particulate traps.

A catalytic converter for treating exhaust gases of an automotive engine includes a housing, a fragile catalyst support structure for holding the catalyst that is used to effect the oxidation of carbon monoxide and hydrocarbons and the reduction of oxides of nitrogen, and a mounting mat disposed between the outer surface of the fragile catalyst support structure and the inner surface of the housing to resiliently hold the fragile catalyst support structure within the housing.

A diesel particulate trap for controlling pollution generated by diesel engines generally includes a housing, a fragile particulate filter or trap for collecting particulate from the diesel engine emissions, and a mounting mat that is disposed between the outer surface of the filter or trap and the inner surface of the housing to resiliently hold the fragile filter or trap structure within the housing.

The fragile structure generally comprises a monolithic structure manufactured from a frangible material of metal or a brittle, ceramic material such as aluminum oxide, silicon dioxide, magnesium oxide, zirconia, cordierite, silicon carbide and the like. These materials provide a skeleton type of structure with a plurality of gas flow channels. These monolithic structures can be so fragile that even small shock loads or stresses are often sufficient to crack or crush them. In order to protect the fragile structure from thermal and mechanical shock and other stresses noted above, as well as to provide thermal insulation and a gas seal, a mounting mat is positioned within the gap between the fragile structure and the housing.

The mounting mat materials employed should be capable of satisfying any of a number of design or physical requirements set forth by the fragile structure manufacturers or the exhaust gas treatment device manufacturers. For example, the mounting mat material should be capable of substantially retaining its physical properties even when the exhaust gas treatment device has undergone wide temperature fluctuations, which causes significant expansion and contraction of the metal housing in relation to the fragile structure. A mounting mat will inherently have some resistance to heat flow and, in certain embodiments is a good insulator; the mat resists propagation of heat from the substrate to the housing and thereby lowers the steady state operating temperature of the housing for a given steady state operating temperature of the substrate.

Ceramic and metallic substrates used in exhaust gas treatment devices are most often mounted within a metal housing with an inorganic fiber based mounting mat. This mounting mat material may contain only inorganic fibers. However, the mounting mat material may also contain other types of fibers, organic binders, inorganic binder and intumescent materials.

The mounting mat must function across a wide range of operating temperatures to effectively hold the substrate in position and to effectively insulate the substrate in order to keep the temperature of the housing as low as possible. The mounting mat also compensates for the fact that the metal housing expands more or less than the substrate itself. Various exhaust gas treatment devices operate throughout a temperature range of about 20° C. to about 1200° C. Therefore, mounting mats must provide robust holding pressure performance across this wide temperature range while retaining a relatively low housing temperature.

While many mounting mats used in the industry today provide acceptable insulating properties, the industry constantly demands mounting mats which provide greater insulating properties without necessitating larger housings or increased overall mass. What is needed in the industry is a flexible mounting mat for exhaust gas treatment devices which can be easily installed and which can function across a wide range of inlet gas temperatures without a significant loss in mat thickness and corresponding holding pressure performance, while providing a superior reduction in thermal conductance.

It has been found that the thermal conductivity of exhaust gas treatment device mounting mats may be reduced by utilizing high temperature resistant inorganic microspheres incorporated into the mounting mats, which may reduce or eliminate the necessity to utilize a larger gap between the housing and the substrate within the exhaust gas treatment device to provide a lower shell temperature. Thus, provided is a mounting mat for an exhaust gas treatment device comprising high temperature resistant inorganic fibers, organic binder, high temperature resistant inorganic microspheres, and optionally intumescent material, wherein the high temperature resistant inorganic microspheres are present substantially proximate to at least one surface of the mounting mat. By "substantially proximate to at least one surface" is meant that the high temperature resistant inorganic microspheres are substantially present in a region of the mounting mat which is near to an exterior surface of the mounting mat.

Also provided is an exhaust gas treatment device comprising a housing, a fragile structure resiliently mounted within the housing, and at least a first mounting mat disposed in a gap between the housing and the fragile structure, wherein the mounting mat comprises high temperature resistant inorganic fibers, organic binder, high temperature resistant inorganic microspheres and optionally intumescent material, and wherein the high temperature resistant inorganic microspheres are present substantially proximate to at least one surface of the first mounting mat. In certain embodiments, the exhaust gas treatment device may further comprise at least one additional mounting mat disposed in the gap between the housing and the fragile structure, wherein the at least one additional mounting mat comprises inorganic fibers, organic binder, and optionally intumescent material, and wherein the at least one additional mounting mat may be disposed proximate to the housing or the fragile structure and distal to the microsphere containing surface of the first mounting mat.

Additionally provided is a method of making an exhaust gas treatment device, the method comprising (a) wrapping a mounting mat, comprising (1) high temperature resistant inorganic fibers, (2) organic binder, (3) high temperature resistant inorganic microspheres present substantially proximate to at least one surface of the mounting mat and (4) optionally intumescent material, around at least a portion of a fragile structure adapted for treating exhaust gases; and (b) disposing the wrapped fragile structure within a housing, whereby the mounting mat holds the fragile structure resiliently within the housing.

A mounting mat for exhaust gas treatment device applications is disclosed. The mounting mat includes at least one ply or sheet that is comprised of high temperature resistant inorganic fibers, organic binder, and high temperature resistant inorganic microspheres, wherein the high temperature resistant inorganic microspheres are present substantially proximate to at least one surface of the mounting mat. According to certain embodiments, the mounting mat may optionally include an intumescent material. It has been unexpectedly found that the inclusion of high temperature resistant inorganic microspheres in the mounting mat decreases the thermal conductance of the mounting mat.

A device for treating exhaust gases is also provided. The device includes an outer metallic housing, at least one fragile structure that is mounted within the housing by a mounting mat that is disposed between the inner surface of the housing and the outer surface of the fragile structure. The term "fragile structure" is intended to mean and include structures such as metal or ceramic monoliths or the like which may be fragile or frangible in nature, and would benefit from a mounting mat such as is described herein.

Catalyst structures generally include one or more porous tubular or honeycomb-like structures mounted by a thermally resistant material within a housing. Each structure includes anywhere from about 200 to about 900 or more channels or cells per square inch, depending upon the type of exhaust gas treatment device. A diesel particulate trap differs from a catalyst structure in that each channel or cell within the particulate trap is closed at one end or the other. Particulate is collected from exhaust gases in the porous structure until regenerated by a high temperature burnout process. Non-automotive applications for the mounting mat may include catalytic converters for chemical industry emission (exhaust) stacks.

Figure 1:
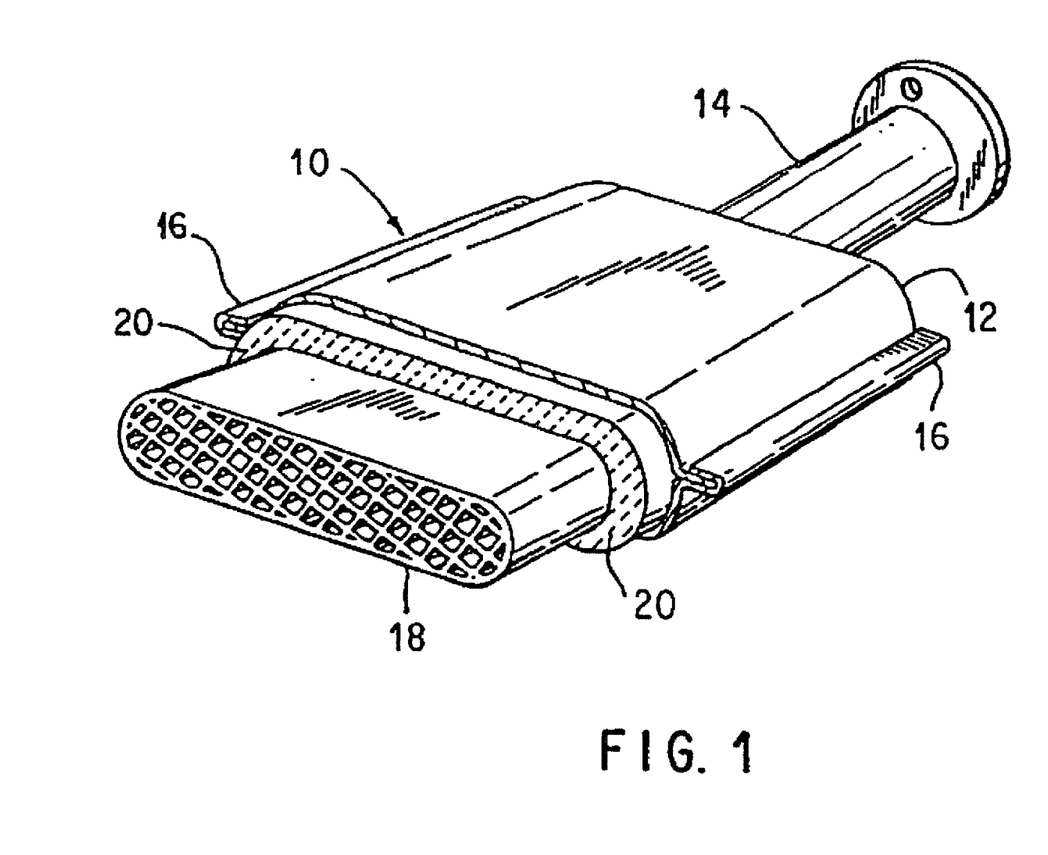
FIG. 1 shows a fragmentary view of an illustrative exhaust gas treatment device including the present mounting mat.

One illustrative form of a device for treating exhaust gases is designated by the numeral 10 in FIG. 1. It should be understood that the mounting mat is not intended to be limited to use in the device shown in FIG. 1, and so the shape is shown only as an illustrative embodiment. In fact, the mounting mat could be used to mount or support any fragile structure suitable for treating exhaust gases, such as a diesel catalyst structure, a diesel particulate trap, or the like.

Catalytic converter 10 may include a generally tubular housing 12 formed of two pieces of metal, for example, high temperature resistant steel, held together by flange 16. Alternatively, the housing may include a preformed canister into which a mounting mat-wrapped fragile structure is inserted. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile structure, such as a frangible ceramic monolith 18, which is supported and restrained within housing 12 by a mounting mat 20. Monolith 18 includes a plurality of gas pervious passages that extend axially from its inlet end surface at one end to its outlet end surface at its opposite end. Monolith 18 may be constructed of any suitable refractory metal or ceramic material in any known manner and configuration. Monoliths are typically oval or round in cross-sectional configuration, but other shapes are possible.

The monolith is spaced from inner surfaces of the housing by a distance or a gap, which will vary according to the type and design of the device utilized, for example, a catalytic converter, a diesel catalyst structure, or a diesel particulate trap. This gap is filled with a mounting mat 20 to provide resilient support to the ceramic monolith 18. The resilient mounting mat 20 provides both thermal insulation to the external environment and mechanical support to the fragile structure, thereby protecting the fragile structure from mechanical shock across a wide range of exhaust gas treatment device operating temperatures.

In general, the mounting mat includes high temperature resistant inorganic fibers, organic binder, high temperature resistant inorganic microspheres, and optionally at least one type of intumescent material, wherein the high temperature resistant inorganic microspheres are present substantially proximate to at least one surface of the mounting mat. The composition of the mounting mat 20 is sufficient to provide a reduction in thermal conductance from the ceramic monolith 18 to the housing 12.

Any high temperature resistant inorganic fibers may be utilized in the mounting mat so long as the fibers can withstand the mounting mat forming process, can withstand the operating temperatures of the exhaust gas treatment devices, and provide the minimum holding pressure performance for holding fragile structure within the exhaust gas treatment device housing at the operating temperatures. Without limitation, suitable inorganic fibers that may be used to prepare the mounting mat and exhaust gas treatment device include high alumina polycrystalline fibers, refractory ceramic fibers such as alumino-silicate fibers, alumina-magnesia-silica fibers, kaolin fibers, alkaline earth silicate fibers such as calcia-magnesia-silica fibers or magnesia-silica fibers, S-glass fibers, S2-glass fibers, E-glass fibers, quartz fibers, silica fibers or combinations thereof.

According to certain embodiments, the high temperature resistant inorganic fibers that are used to prepare the mounting mat comprise ceramic fibers. Without limitation, suitable ceramic fibers include alumina fibers, alumina-silica fibers, alumina-zirconia-silica fibers, zirconia-silica fibers, zirconia fibers and similar fibers. A useful alumina-silica ceramic fiber is commercially available from Unifrax I LLC (Niagara Falls, N.Y.) under the registered trademark FIBERFRAX. The FIBERFRAX ceramic fibers comprise the fiberization product of from about 45 to about 75 weight percent alumina and from about 25 to about 55 weight percent silica. The FIBERFRAX fibers exhibit operating temperatures of up to about 1540° C. and a melting point up to about 1870° C. The FIBERFRAX fibers can be easily formed into high temperature resistant sheets and papers.

The alumina/silica fiber may comprise from about 40 weight percent to about 60 weight percent $Al_2O_3$ and from about 60 weight percent to about 40 weight percent $SiO_2$. The fiber may comprise about 50 weight percent $Al_2O_3$ and about 50 weight percent $SiO_2$. The alumina/silica/magnesia glass fiber typically comprises from about 64 weight percent to about 66 weight percent $SiO_2$, from about 24 weight percent to about 25 weight percent $Al_2O_3$, and from about 9 weight percent to about 10 weight percent MgO.

The E-glass fiber typically comprises from about 52 weight percent to about 56 weight percent $SiO_2$, from about 16 weight percent to about 25 weight percent CaO, from about 12 weight percent to about 16 weight percent $Al_2O_3$, from about 5 weight percent to about 10 weight percent $B_2O_3$, up to about 5 weight percent MgO, up to about 2 weight percent of sodium oxide and potassium oxide and trace amounts of iron oxide and fluorides, with a typical composition of 55 weight percent $SiO_2$, 15 weight percent $Al_2O_3$, 7 weight percent $B_2O_3$, 3 weight percent MgO, 19 weight percent CaO and traces of the above mentioned materials.

The term "biosoluble inorganic fiber" refers to fibers that are soluble or otherwise decomposable in a physiological medium or in a simulated physiological medium such as simulated lung fluid, saline solutions, buffered saline solutions, or the like. The solubility of the fibers may be evaluated by measuring the solubility of the fibers in a simulated physiological medium as a function of time. Biosolubility can also be estimated by observing the effects of direct implantation of the fibers in test animals or by the examination of animals or humans that have been exposed to fibers, i.e. biopersistence. A method for measuring the biosolubility (i.e. the non-durability) of the fibers in physiological media is disclosed in U.S. Pat. No. 5,874,375 assigned to Unifrax I LLC, which is incorporated herein by reference. Other methods are suitable for evaluating the biosolubility of inorganic fibers. According to certain embodiments, the biosoluble fibers exhibit a solubility of at least 30 ng/cm$^2$-hr when exposed as a 0.1 g sample to a 0.3 ml/min flow of simulated lung fluid at 37° C. According to other embodiments, the biosoluble inorganic fibers may exhibit a solubility of at least 50 ng/cm$^2$-hr, or at least 100 ng/cm$^2$-hr, or at least 1000 ng/cm$^2$-hr when exposed as a 0.1 g sample to a 0.3 ml/min flow of simulated lung fluid at 37° C.

Another approach to estimating the biosolubility of fibers is based on the composition of the fibers. For example, Germany classifies respirable inorganic oxide fibers based on a compositional index (KI value). The KI value is calculated by a summation of the weight percentages of alkaline and alkaline-earth oxides and subtraction of two times the weight percent of aluminum oxide in inorganic oxide fibers. Inorganic fibers that are biosoluble typically have a KI value of about 40 or greater.

Without limitation, suitable examples of biosoluble alkaline earth silicate fibers that can be used to prepare a mounting mat for an exhaust gas treatment device include those fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, which are incorporated herein by reference.

Suitable high temperature resistant biosoluble inorganic fibers that may be used include, without limitation, alkaline earth silicate fibers, such as calcia-magnesia-silicate fibers or magnesia-silicate fibers, calcia-aluminate fibers, potassia-calcia-aluminate fibers, potassia-alumina-silicate fibers, or sodia-alumina-silicate fibers.

According to certain embodiments, the biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of from about 60 to about 90 weight percent silica, from greater than 0 to about 35 weight percent magnesia and 5 weight percent or less impurities. According to certain embodiments, the alkaline earth silicate fibers comprise the fiberization product of from about 65 to about 86 weight percent silica, from about 14 to about 35 weight percent magnesia and 5 weight percent or less impurities. According to other embodiments, the alkaline earth silicate fibers comprise the fiberization product of from about 70 to about 86 weight percent silica, from about 14 to about 30 weight percent magnesia, and 5 weight percent or less impurities. A suitable magnesium-silicate fiber is commercially available from Unifrax I LLC (Niagara Falls, N.Y.) under the registered trademark ISOFRAX. Commercially available ISOFRAX fibers generally comprise the fiberization product of from about 70 to about 80 weight percent silica, from about 18 to about 27 weight percent magnesia and 4 weight percent or less impurities.

According to certain embodiments, the biosoluble alkaline earth silicate fibers may comprise the fiberization product of a mixture of oxides of calcium, magnesium and silica. These fibers are commonly referred to as calcia-magnesia-silica fibers. According to certain embodiments, the calcia-magnesia-silicate fibers comprise the fiberization product of from about 45 to about 90 weight percent silica, from greater than 0 to about 45 weight percent calcia, from greater than 0 to about 35 weight percent magnesia, and 10 weight percent or less impurities. Useful calcia-magnesia-silicate fibers are commercially available from Unifrax I LLC (Niagara Falls, N.Y.) under the registered trademark INSULFRAX. INSULFRAX fibers generally comprise the fiberization product of from about 61 to about 67 weight percent silica, from about 27 to about 33 weight percent calcia, and from about 2 to about 7 weight percent magnesia. Other suitable calcia-magnesia-silicate fibers are commercially available from Thermal Ceramics (Augusta, Ga.) under the trade designations SUPERWOOL 607, SUPERWOOL 607 MAX and SUPERWOOL HT. SUPERWOOL 607 fibers comprise from about 60 to about 70 weight percent silica, from about 25 to about 35 weight percent calcia, from about 4 to about 7 weight percent magnesia, and trace amounts of alumina. SUPERWOOL 607 MAX fibers comprise about 60 to about 70 weight percent silica, from about 16 to about 22 weight percent calcia, and from about 12 to about 19 weight percent magnesia, and trace amounts of alumina. SUPERWOOL HT fiber comprise about 74 weight percent silica, about 24 weight percent calcia and trace amounts of magnesia, alumina and iron oxide.

According to certain embodiments, the biosoluble alkaline earth silicate fibers may comprise the fiberization product of a mixture of oxides of calcium and aluminum. According to certain embodiments, at least 90 weight percent of the calcia-aluminate fibers comprise the fiberization product of from about 50 to about 80 weight percent calcia, from about 20 to less than 50 weight percent alumina, and 10 weight or less percent impurities. According to other embodiments, at least 90 weight percent of the calcia-aluminate fibers comprise the fiberization product of from about 50 to about 80 weight percent alumina, from about 20 to less than 50 weight percent calcia, and 10 weight percent or less impurities.

According to certain embodiments, the biosoluble alkaline earth silicate fibers may comprise the fiberization product of a mixture of oxides of potassium, calcium and aluminum. According to certain embodiments, the potassia-calcia-aluminate fibers comprise the fiberization product of from about 10 to about 50 weight percent calcia, from about 50 to about 90 weight percent alumina, from greater than 0 to about 10 weight percent potassia, and 10 weight percent or less impurities.

Suitable silica fibers used in the production of a mounting mat for an exhaust gas treatment device include those leached glass fibers available from BelChem Fiber Materials GmbH, Germany, under the trademark BELCOTEX, from Hitco Carbon Composites, Inc. of Gardena, Calif., under the registered trademark REFRASIL, and from Polotsk-Steklovolokno, Republic of Belarus, under the designation PS-23(R).

The BELCOTEX fibers are standard type, staple fiber pre-yarns. These fibers have an average fineness of about 550 tex and are generally made from silicic acid modified by alumina. The BELCOTEX fibers are amorphous and generally contain about 94.5 silica, about 4.5 percent alumina, less than 0.5 percent sodium oxide, and less than 0.5 percent of other components. These fibers have an average fiber diameter of about 9 microns and a melting point in the range of 1500° to 1550° C. These fibers are resistant to temperatures of up to 1100° C., and are typically shot free and binder free.

The REFRASIL fibers, like the BELCOTEX fibers, are amorphous leached glass fibers high in silica content for providing thermal insulation for applications in the 1000° C. to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4 percent by weight with other components being present in an amount of 1 percent or less.

The PS-23 (R) fibers from Polotsk-Steklovolokno, Republic of Belarus, are amorphous glass fibers high in silica content and are suitable for thermal insulation for applications requiring resistance to at least about 1000° C. These fibers have a fiber length in the range of from about 5 mm to about 20 mm and a fiber diameter of about 9 microns. These fibers, like the REFRASIL fibers, have a melting point of about 1700° C.

The intumescent material that may be incorporated into the mounting mat includes, without limitation, unexpanded vermiculite, ion-exchanged vermiculite, heat treated vermiculite, expandable graphite, hydrobiotite, water-swelling tetrasilicic flourine mica, alkaline metal silicates, or mixtures thereof. The mounting mat may include a mixture of more than on type of intumescent material. The intumescent material may comprise a mixture of unexpanded vermiculite and expandable graphite in a relative amount of from about 9:1 to about 1:2 vermiculite:graphite, as described in U.S. Pat. No. 5,384,188.

The mounting mat also includes a binder or mixture of more than one type of binder. Suitable binders include organic binders, inorganic binders and mixtures of these two types of binders. According to certain embodiments, the intumescent mounting mat includes one or more organic binders. The organic binders may be provided as a solid, a liquid, a solution, a dispersion, a latex, an emulsion, or similar form. The organic binder may comprise a thermoplastic or thermoset binder, which after cure is a flexible material that can be burned out of an installed mounting mat. Examples of suitable organic binders include, but are not limited to, acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resins include low temperature, flexible thermosetting resins such as unsaturated polyesters, epoxy resins and polyvinyl esters.

The organic binder may be included in the mounting mat in an amount of greater than 0 to about 20 weight percent, from about 0.5 to about 15 weight percent, from about 1 to about 10 weight percent and from about 2 to about 8 weight percent, based on the total weight of the mounting mat.

The mounting mat may include polymeric binder fibers instead of, or in addition to, a resinous or liquid binder. These polymeric binder fibers may be used in amounts ranging from greater than 0 to about 20 weight percent, from about 1 to about 15 weight percent, and from about 2 to about 10 weight percent, based upon 100 percent by weight of the total composition, to aid in binding the high temperature resistant inorganic fibers together. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof.

In certain embodiments, the organic binder is a sacrificial binder employed to initially bond the fibers together. By "sacrificial," it is meant that the organic binder will be burned out of the mounting mat as the temperature of the mounting mat increases towards operating temperatures.

In addition to organic binders, the mounting mats may also include inorganic binder material. Without limitation, suitable inorganic binder materials include colloidal dispersions of alumina, silica, zirconia, and mixtures thereof.

According to certain embodiments, the mounting mat includes an effective amount of a clay material. Without limitation, the clay material may be included in the mounting mat in an amount from about 1 to about 10 weight percent, based on the total weight of the mounting mat. Suitable clays that may be included in the intumescent mounting mat include, without limitation, attapulgite, ball clay, bentonite, hectorite, kyanite, kaolinite, montmorillonite, palygorskite, saponite, sepiolite, silimanite, or combinations thereof.

As used herein, a "high temperature resistant inorganic microsphere" can be any particle which is made from a glass or ceramic material which comprises an outer shell and an interior void, with an average diameter of less than 1 mm, and can withstand temperatures of up to 600° C. without substantially losing the beneficial physical properties for which the high temperature resistant microspheres are utilized in the present mounting mat, end cone, or exhaust gas treatment device. Any commercially available microspheres which are suitable for use in the mounting mat as herein described may be used.

Without limitation, of particular interest in high temperature applications are hollow glass microspheres. Hollow glass microspheres are commercially available from Potters Industries, Valley Forge, Pa., 3M, St. Paul, Minn., and Ceno Technologies, Buffalo, N.Y., among others. Hollow glass microspheres are available in a wide range of sizes, and can be produced within a small tolerance of a preferred size. Potters Industries SPHERICEL® Fused Borosilicate Hollow Glass Spheres are available in various densities, strengths, sizes and size distributions. For example, Potters Industries' SPHERICEL® 60P18 Hollow Glass Spheres provide a mixture of spheres with a mean particle size of 16-20 µm, wherein 90% of the spheres are within the range of 6-32 µm, with a density of 0.60 g/cm$^3$ and a crush resistance strength (wherein 90% of the spheres will survive such forces) of 11,000 psi. SPHERICEL® 110P8 Hollow Glass Spheres provide a mixture of spheres with a mean particles size of 9-13 µm, wherein 90% of the spheres are within the range of 4-21 µm, with a density of 1.10 g/cm$^3$ and a strength resistance of 10,000 psi. SPHERICEL® 25P45 Hollow Glass Spheres provide a mixture of spheres with a mean particle size of 40-60 µm, wherein 90% of the spheres are within the range of 15-75 µm, with a density of 0.25 g/cm$^3$ and a strength resistance of 750 psi.

The high temperature resistant inorganic microspheres may be added to the mounting mat in amounts from about 1.5% up to about 15% by weight of the total weight of the mat. When the microspheres are added to a single-layered mounting mat, the microspheres may be added in an amount of from about 3% by weight to about 12% by weight, in some embodiments from about 5% by weight to about 10% by weight, based on the total dry weight of the mounting mat. The microspheres are preferably present substantially proximate to at least one surface of the mounting mat. That is, when the mounting mat is placed in the exhaust gas treatment device, the surface having local microspheres may be positioned proximate to the substrate or the housing. In certain embodiments, the mounting mat surface having local microspheres is positioned proximate to the housing.

The mounting mat may also be provided in a layered form, wherein multiple thinner mounting mats are incorporated into a single thicker mounting mat assembly. In such layered mounting mats, the high temperature resistant inorganic microspheres may be incorporated into only one or less than all of the layers, in which layers the microspheres may optionally be evenly dispersed throughout the layer. In certain embodiments, the high temperature resistant inorganic microspheres may be added in an amount of from about 1.5% to about 15%, in other embodiments from about 6% to about 12%, and may be concentrated in the mat layer(s) which are oriented closer to either the substrate or to the housing. This has been shown to provide resistance to thermal conductivity at an overall use of fewer microspheres.

The mounting mat may be produced in any way known in the art for forming sheet-like materials. For example, conventional paper-making processes, either hand laid or machine laid, may be used to prepare the intumescent sheet material. A handsheet mold, a Fourdrinier paper machine, or a rotoformer paper machine can be employed to make the intumescent sheet material.

For example, using a papermaking process, the inorganic fibers, intumescent material, and microspheres may be mixed together with a binder or other fibers capable of acting as a binder to form a mixture or slurry. Alternatively, the microspheres may be incorporated into the binder and then added to the other ingredients as a dispersion. The slurry of components may be flocculated by adding a flocculating agent to the slurry. The flocculated mixture or slurry is placed onto a papermaking machine to be formed into a ply or sheet of fiber containing paper. The sheet is dried by air drying or oven drying. U.S. Pat. No. 3,458,329, the disclosure of which is incorporated herein by reference, provides a more detailed description of standard papermaking techniques employed.

Alternatively, the plies or sheets may be formed by vacuum casting the slurry. According to this method, the slurry of components is wet laid onto a pervious web. A vacuum is applied to the web to extract the majority of the moisture from the slurry, thereby forming a wet sheet. The wet plies or sheets are then dried, typically in an oven. The sheet may be passed through a set of rollers to compress the sheet prior to drying.

In other embodiments, the fibers may be processed into a mounting mat by conventional means such as dry air laying. The mat at this stage has very little structural integrity and is very thick relative to conventional catalytic converter and diesel trap mounting mats. The resultant mat can therefore be dry needled, as is commonly known in the art, to densify the mat and increase its strength.

Where the dry air layering technique is used, the mat may be alternatively processed by the addition of a binder to the mat by impregnation to form a discontinuous fiber composite. In this technique, the binder is added after formation of the mat, rather than forming the mat as noted hereinabove with respect to the conventional papermaking technique. This method of preparing the mat aids in maintaining fiber length by reducing breakage.

Methods of impregnation of the mat with the binder include complete submersion of the mat in a liquid binder system, or alternatively spraying the mat. In a continuous procedure, a fiber mat which can be transported in roll form, is unwound and moved, such as on a conveyer or scrim, past spray nozzles which apply the binder to the mat. Alternatively, the mat can be gravity-fed past the spray nozzles. The binder-impregnated mat is then passed between press rolls, which remove excess liquid and densify the mat to approximately its desired thickness. The densified mat may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The mounting mat can also be made in a batch mode, by immersing a section of the mat in a liquid binder, removing the mat and pressing to remove excess liquid, thereafter drying to form the composite and storing or cutting to size.

It is noted that mounting mats may be too low in density for easy use in certain applications. Therefore, they may undergo further densification by any manner known in the art to provide a higher density. One such manner of densification is to needle punch the fibers so as to intertwine and entangle them. Additionally or alternatively, hydro-entangling methods may be used. Another alternative is to press the fibers into a mat form by rolling them through press rollers. Any of these methods of densification of the mats or a combination of these methods can be readily used to obtain a mounting mat of the correct and desired form.

Regardless of which of the above-described techniques are employed, the composite can be cut, such as by die stamping, to form mounting mats of exact shapes and sizes with reproducible tolerances. The mounting mat 20 exhibits suitable handling properties upon densification as by needling or the like, meaning it can be easily handled and is not so brittle as to crumble in one's hand like many other fiber blankets or mats. It can be easily and flexibly fitted or wrapped around the fragile structure 18 or like fragile structure without cracking, and then disposed within the catalytic converter housing 12. Generally, the mounting mat-wrapped fragile structure can be inserted into a housing or the housing can be built or otherwise fabricated around the mounting mat-wrapped fragile structure.

In certain embodiments, with respect to non-intumescent mounting mats, the mounting mat may be capable of maintaining a minimum holding pressure of at least 10 kPa or at least 50 kPa, after undergoing 1000 mechanical cycles of a standard 1000 cycle gap expansion test conducted at a hot face temperature of about 300° C., with a mat gap bulk density of from about 0.3 to about 0.6 g/cm$^3$, and a percent gap expansion of about 2 percent. In other embodiments, with respect to intumescent mounting mats, the mounting mat may capable of maintaining a minimum holding pressure of at least 10 kPa or at least 50 kPa after undergoing 1000 mechanical cycles of a standard 1000 cycle gap expansion test conducted at a hot face temperature of about 300° C., with a mat gap bulk density of from about 0.7 to about 1.25 g/cm$^3$, and a percent gap expansion of about 2 percent. It will be appreciated that this test is particularly suited for mounting mats to be used in holding heavier substrates in high G load applications in low temperature applications. Exhaust gas treatment devices for such applications include diesel catalyst structures and diesel particulate traps.

By the term "cycle" it is meant that the gap between the monolith (i.e., fragile structure) and housing is opened and closed over a specific distance and at a predetermined rate. In order to simulate realistic conditions, the expansion of the gap between a housing and a fragile structure of a given diameter may be determined by calculating the coefficient of thermal expansion of a conventional housing at a temperature of, for example, about 900° C. A final mat basis weight is then selected that will meet the criteria of the test, and provide a minimum holding force (Pmin) of greater than about 10 kPa after 1000 cycles. The goal is to provide adequate support at the lowest cost, so the minimum basis weight that satisfies the greater than about 10 kPa requirement may be selected.

In operation, the device experiences a significant change in temperature. Due to the differences in their thermal expansion coefficients, the housing may expand more than the support structure 18, such that the gap between these elements will increase slightly. In a typical case, the gap may expand and contract on the order of about 0.25 to about 0.5 mm during thermal cycling of the device. The thickness and mounting density of the mounting mat may be selected such that a minimum holding pressure of at least about 10 kPa is maintained under all conditions to prevent the fragile structure from vibrating loose. The mounting pressure exerted by the mounting mat 20 under these conditions permits accommodation of the thermal characteristics of the assembly without compromising the physical integrity of the constituent elements.

The following examples are set forth merely to further illustrate the mounting mat and exhaust gas treatment device. The illustrative examples should not be construed as limiting the mounting mat, exhaust gas treatment device incorporating the mounting mat, or the methods of making the mounting mat or the exhaust gas treatment device in any manner.

EXAMPLES 1, 2, AND 4-7 AND COMPARATIVE EXAMPLE 3

Mounting mats were made using a refractory ceramic fiber (FIBERFRAX®) aluminosilicate fiber from Unifrax I LLC, Niagara Falls, N.Y.), a binder and microspheres (Sphericel® 25P45 from Potters Industries, Valley Forge, Pa.), according to the handsheet mold method, described hereinabove. All of the Examples contained refractory ceramic fiber, a sufficient amount of binder, and glass microspheres, the microspheres being added in the following proportions.

Example 1 contained 5% by weight microspheres, and Example 2 contained 10% by weight microspheres, based on the total weight of the mounting mat. In both of Examples 1 and 2, the microspheres were dispersed homogenously throughout the mounting mats. Comparative Example 3 contained no microspheres. Example 4 contained 6% by weight microspheres, Example 5 contained 12% by weight microspheres, Example 6 contained 1.5% by weight microspheres, and Example 7 contained 3% by weight microspheres, based on the total weight of the mounting mat. Examples 4-7 were made in a layered manner, with multiple mounting mat layers comprising the finished mounting mat. The layers closer to the substrate contained a larger proportion of the glass microspheres.

Figure 2:
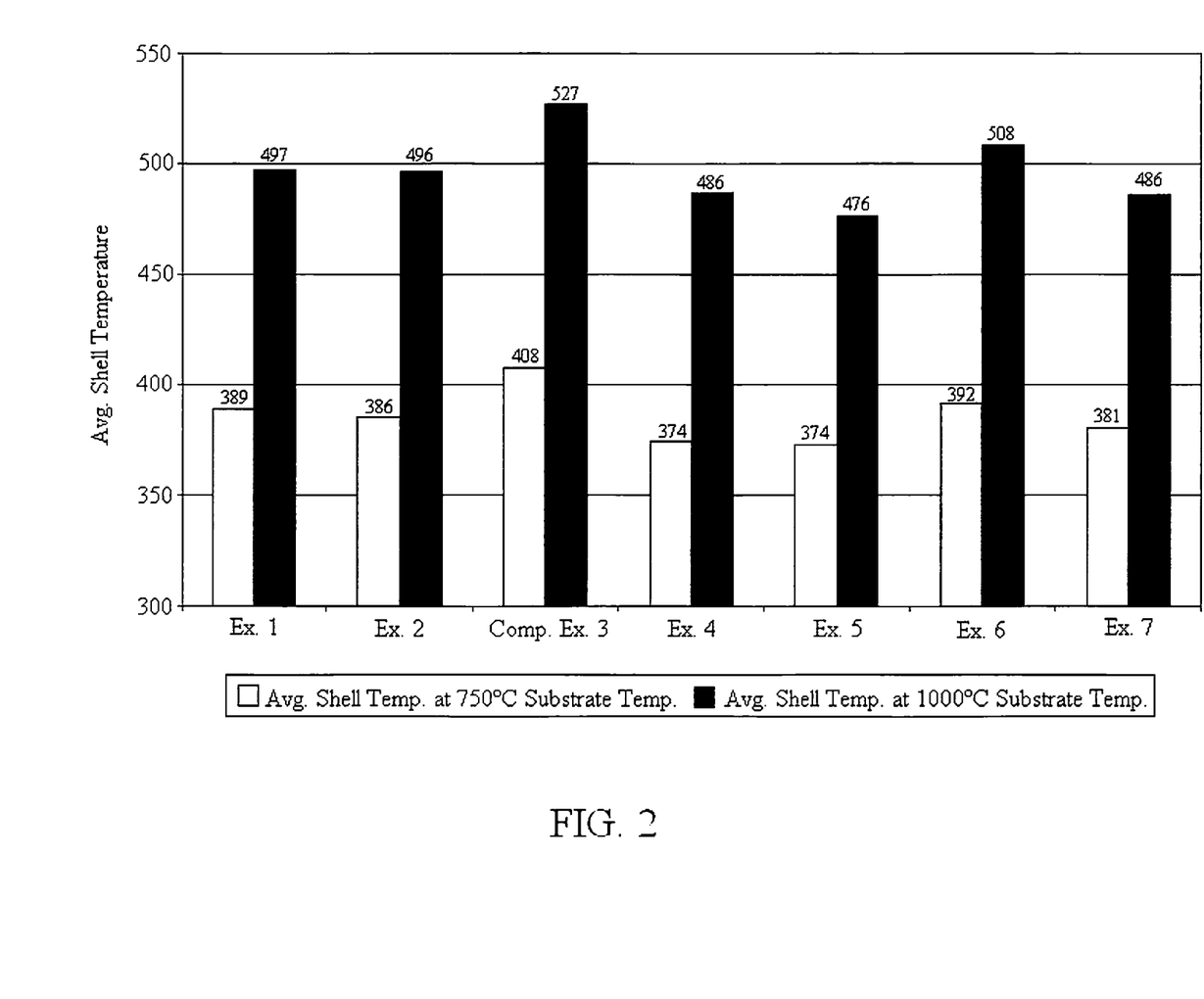
FIG. 2 is a chart depicting the average shell temperature of various embodiments of the present mounting mat as compared to a prior art mounting mat as a function of monolith temperature (° C.).

The mounting mats were then wrapped around a substrate and enclosed within a housing, as described hereinabove. In each Example, the average gap between the substrate and the housing was about 4 mm. The substrates within the assembled devices were then heated to 750° C. and 1000° C., which temperatures were maintained for 60 minutes. After 60 minutes, the temperature of the outside of the housing of each Example was read multiple times, and an average of these temperatures was taken. FIG. 2 shows the resulting average shell temperatures for each Example. FIG. 2 shows that the mounting mats containing glass microspheres, especially those which contained microspheres in a layered fashion, provide greater resistance to thermal conductance than comparable mounting mats which contain no microspheres.

EXAMPLES 8, 9, 11 AND 12 AND COMPARATIVE EXAMPLES 10 AND 13

Mounting mats were made by layering four mounting mat layers made according to the above procedure of Examples 1-7. The layers are numbered 1 through 4, with layer no. 1 being engaged with the substrate, and layer 4 being engaged with the housing. In Examples 8 and 11, layers 1-3 contained no microspheres, and layer 4 contained 6% microspheres. In Examples 9 and 12, layer 1 contained 6% microspheres and layers 2-4 contained no microspheres. In Comparative Examples 10 and 13, all layers contained no microspheres.

The mounting mats were then wrapped around a substrate and enclosed within a housing, as described hereinabove. In each Example, the average gap between the substrate and the housing was about 4 mm. The substrates within the assembled devices were then heated to 1100° C. for Examples 8 and 9 and Comparative Example 10 and 1000° C. for Examples 11 and 12 and Comparative Example 13, which temperatures were maintained for 60 minutes. After 60 minutes, the temperature of the outside of the housing was read multiple times for each Example, and an average of these temperatures was taken. Table 1 indicates the resulting average shell temperatures for each Example.

Table 1 demonstrates that the mounting mats containing glass microspheres provide greater resistance to thermal conductance than comparable mounting mats which contain no microspheres, and that layered mounting mats containing glass microspheres in layers nearer to the housing provide greater resistance to thermal conductance than comparable mounting mats which contain glass microspheres in layers nearer to the substrate. Without wishing to be limited by theory, it is believed that the microspheres provide greater resistance to thermal conductance and a lower shell temperature when they are present in greater amounts nearer to the housing, because the microspheres can more readily withstand the lower temperatures experienced closer to the housing.

TABLE 1

| Example # | Microspheres Layer | Substrate Temperature (° C.) | Average Shell Temperature (° C.) |
| --- | --- | --- | --- |
| Example 8 | Layer 4 | 1100 | 479 |
| Example 9 | Layer 1 | 1100 | 517 |
| Comp. Ex. 10 | None | 1100 | 538 |
| Example 11 | Layer 4 | 1000 | 463 |
| Example 12 | Layer 1 | 1000 | 472 |
| Comp. Ex. 13 | None | 1000 | 488 |

The subject mounting mats are advantageous to the catalytic converter and diesel particulate trap industry. The mounting mats can be die cut and are operable as resilient supports in a thin profile, providing ease of handling, and in a flexible form, so as to be able to provide a total wrap of the catalyst support structure, if desired, without cracking. The mounting mat may be integrally wrapped about the entire circumference or perimeter of at least a portion of the catalyst support structure. The mounting mat may also be partially wrapped and include an end-seal as currently used in some conventional converter devices, if desired, to prevent gas by-pass.

The mounting mats containing high temperature resistant inorganic microspheres described above are also useful in a variety of applications such as conventional automotive catalytic converters for, among others, motorcycles and other small engine machines, and automotive preconverters, as well as high temperature spacers, gaskets, and even future generation automotive underbody catalytic converter systems. Generally, they can be used in any application requiring a mat or gasket to exert holding pressure at room temperature and, more importantly, to provide the ability to maintain the holding pressure at elevated temperature, including during thermal cycling.

The mounting mat material containing high temperature resistant inorganic microspheres may be used as end cone insulation in an exhaust gas treatment device. According to certain embodiments, an end cone for an exhaust gas treatment device is provided. The end cone generally comprises an outer metallic cone, an inner metallic cone and end cone insulation that is disposed within the gap or space between the outer and inner metallic end cones.

According to other embodiments, the end cone may comprise an outer metallic cone, an inner metallic cone, and cone insulation disposed between the outer and inner metallic end cones, the cone insulation comprising high temperature resistant inorganic fibers, organic binder, high temperature resistant inorganic microspheres, and optionally intumescent material, and wherein the high temperature resistant inorganic microspheres are present substantially proximate to at least one surface of the end cone.

According to further embodiments, the end cone may comprise an outer metallic cone and self-supporting cone insulation, comprising high temperature resistant inorganic fibers, organic binder, high temperature resistant inorganic microspheres, and optionally intumescent material, disposed adjacent to the inner surface of the outer metallic cone. According to these embodiments, the end cone assembly is not provided with an inner metallic cone, and wherein the high temperature resistant inorganic microspheres are present substantially proximate to the outer metallic cone.

An exhaust gas treatment device including at least one end cone is provided. The exhaust gas treatment device comprises a housing, a fragile structure positioned within the housing, an inlet and an outlet end cone assemblies for attaching exhaust pipes or conduits to the housing, each end cone assembly comprising an inner end cone housing and an outer end cone housing; and end cone insulation comprising high temperature resistant inorganic fibers, organic binder, high temperature resistant inorganic microspheres, and optionally intumescent materials positioned between the inner and outer cone housings.

The mounting mats containing high temperature resistant inorganic microspheres described above can also be used in catalytic converters employed in the chemical industry which are located within exhaust or emission stacks, including those which contain fragile honeycomb type structures that need to be protectively mounted.

While the mounting mat and exhaust gas treatment device have been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the mounting mat and exhaust gas treatment device should not be limited to any single embodiment, but rather construed in breadth and scope in accordance with the recitation of the appended claims.

The invention claimed is:

1. An end cone for an exhaust gas treatment device comprising:
    an outer metallic cone;
    an inner metallic cone; and
    cone insulation disposed between the outer and inner metallic end cones, the cone insulation comprising high temperature resistant inorganic fibers, organic binder, high temperature resistant inorganic microspheres, and optionally intumescent material, wherein the high temperature resistant inorganic microspheres are present substantially proximate to the outer metallic cone, and wherein the microspheres are capable of withstanding temperatures of up to about 600° C. without losing the ability to provide resistance to thermal conductance to the cone insulation.

2. An end cone for an exhaust gas treatment device comprising:
    an outer metallic cone; and
    self-supporting cone insulation, comprising high temperature resistant inorganic fibers, organic binder, high temperature resistant inorganic microspheres, and optionally intumescent material, disposed adjacent the inner surface of the outer metallic end cone, wherein the high temperature resistant inorganic microspheres are present substantially proximate to the outer metallic cone, and wherein the microspheres are capable of withstanding temperatures of up to about 600° C. without losing the ability to provide resistance to thermal conductance to the self-supporting cone insulation.

3. An exhaust gas treatment device comprising:
    a housing;
    a fragile structure resiliently mounted within the housing; and
    a layered mounting mat assembly comprising at least first and second mounting mat layers comprising:
        high temperature resistant inorganic fibers;
        organic binder; and
        optionally an intumescent material;
        wherein the at least first mounting mat layer which is proximate to an exterior surface of the mounting mat assembly comprises high temperature resistant inorganic microspheres, optionally dispersed evenly therethrough; and
        wherein the microspheres are capable of withstanding temperatures of up to about 600° C. without losing the ability to provide resistance to thermal conductance to the mounting mat;
    wherein the exterior surface of the layered mounting mat assembly comprising the at least first mounting mat layer is proximate to the housing.

4. The exhaust gas treatment device of claim 3, wherein the high temperature resistant inorganic microspheres are added to the at least first mounting mat layer in an amount of from about 1.5% to about 15% by weight, based on the total weight of the at least first mounting mat layer.

5. The exhaust gas treatment device of claim 3, wherein the high temperature resistant inorganic microspheres are added to the at least first mounting mat layer in an amount of from about 3% to about 12% by weight, based on the total weight of the at least first mounting mat layer.

6. The exhaust gas treatment device of claim 3, wherein the high temperature resistant inorganic fibers are at least one of high alumina polycrystalline fibers, refractory ceramic fibers, mullite fibers, glass fibers, high temperature resistant biosoluble fibers, quartz fibers, silica fibers, or combinations thereof.

7. The exhaust gas treatment device of claim 6, wherein the high alumina polycrystalline fibers comprise the fiberization product of from about 72 to about 100 weight percent alumina and from 0 to about 28 weight percent silica.

8. The exhaust gas treatment device of claim 6, wherein the refractory ceramic fibers comprise alumino-silicate fibers comprising the fiberization product of from about 45 to about 72 weight percent alumina and from about 28 to about 55 weight percent silica.

9. The exhaust gas treatment device of claim 6, wherein the biosoluble fibers comprise magnesia-silica fibers comprising the fiberization product of from about 65 to about 86 weight percent silica, from about 14 to about 35 weight percent magnesia and about 5 weight percent or less impurities.

10. The exhaust gas treatment device of claim 6, wherein the biosoluble fibers comprise calcia-magnesia-silica fibers comprising the fiberization product of from about 45 to about 90 weight percent silica, from greater than 0 to about 45 weight percent calcia, and from greater than 0 to about 35 weight percent magnesia.

11. The exhaust gas treatment device of claim 3, wherein the intumescent material is at least one of unexpanded vermiculite, ion exchanged vermiculite, heat treated vermiculite, expandable graphite, hydrobiotite, water-swelling tetrasilicic flourine mica, alkaline metal silicates, or mixtures thereof 12. The exhaust gas treatment device of claim 11, wherein the intumescent material comprises unexpanded vermiculite.

13. The exhaust gas treatment device of claim 3, wherein the device is a catalytic converter or diesel particulate trap.

14. The exhaust gas treatment device of claim 3, wherein the high temperature resistant inorganic microspheres are dispersed evenly through the at least first mounting mat layer.

\* \* \* \* \*